Aug. 14, 1956 N. R. HENRY 2,758,728
AUTOMATIC HOPPER FEED CONVEYOR MECHANISM
Filed Dec. 20, 1952 2 Sheets-Sheet 1

*INVENTOR.*
NELSON R. HENRY
BY

ATTORNEY

Aug. 14, 1956  N. R. HENRY  2,758,728
AUTOMATIC HOPPER FEED CONVEYOR MECHANISM
Filed Dec. 20, 1952  2 Sheets-Sheet 2

INVENTOR.
NELSON R. HENRY
BY
ATTORNEY

United States Patent Office 2,758,728
Patented Aug. 14, 1956

2,758,728

AUTOMATIC HOPPER FEED CONVEYOR MECHANISM

Nelson R. Henry, De Kalb County, Ga., assignor to The Woodman Company, Inc., Decatur, Ga., a corporation of Georgia Application December 20, 1952, Serial No. 327,111

9 Claims. (Cl. 214—17)

This invention relates to automatic hopper feed conveyor mechanism, and more particularly to mechanism for feeding material from a conveyor belt.

In the food packaging industry, potato chips and like materials are first processed and then placed on a conveyor belt for distribution to various hoppers positioned at spaced intervals along the edge of the conveyor belt. The hoppers, in turn, feed automatic weighing and packaging devices.

In the past, deflecting plates or plows were slidably supported on arms extending at oblique angles from the sides of the conveyor belt to deflect the materials from the conveyor belt into the desired hopper. These plows are usually manually operated and are intermittently placed in the path of the belt to thereby deflect material into an adjacent hopper. Since the driving power for pushing the material into the hopper is supplied by the conveyor belt, materials often tend to pile up in front of the plow and when deflected into the hopper tend to break, thus providing an inferior product. In addition, the hopper requires constant attention to determine when it is desirable to convey additional material thereto. Since floor space is usually at a premium, the plows present another problem in that the supporting arms for these plows extend from the side of the conveyor, thus increasing the amount of floor space necessary for each conveyor.

In overcoming the disadvantages described above, I have provided an automatic hopper feed conveyor mechanism including a series of paddles which pass transversely across a moving conveyor belt and push the material from this conveyor belt onto an inclined chute and into a hopper, the operation of the paddles being controlled by a detecting means which determines when the hopper is filled.

Accordingly, it is an object of my invention to provide an automatic hopper feed conveyor mechanism which requires no additional floor space and will feed material from a belt conveyor into a hopper, maintaining a substantially constant level of material in the hopper.

Another object of my invention is to provide an automatic hopper feed conveyor mechanism which when not in operation will not materially affect the continuous flow of the material on the conveyor belt.

Another object of my invention is to provide an automatic hopper feed conveyor mechanism which is particularly adapted to conveying light and delicate materials in such a way as to minimize any breaking thereof.

Another object of my invention is to provide an automatic hopper feed conveyor having paddles controlled by an automatic feed mechanism which will position paddles in substantially the same place whenever the machine is stopped.

Other and further objects and advantages of my invention will become apparent from the following description when taken in conjunction with the accompanying drawings wherein like characters of reference designate corresponding parts throughout the several views, and wherein.

Figure 1:
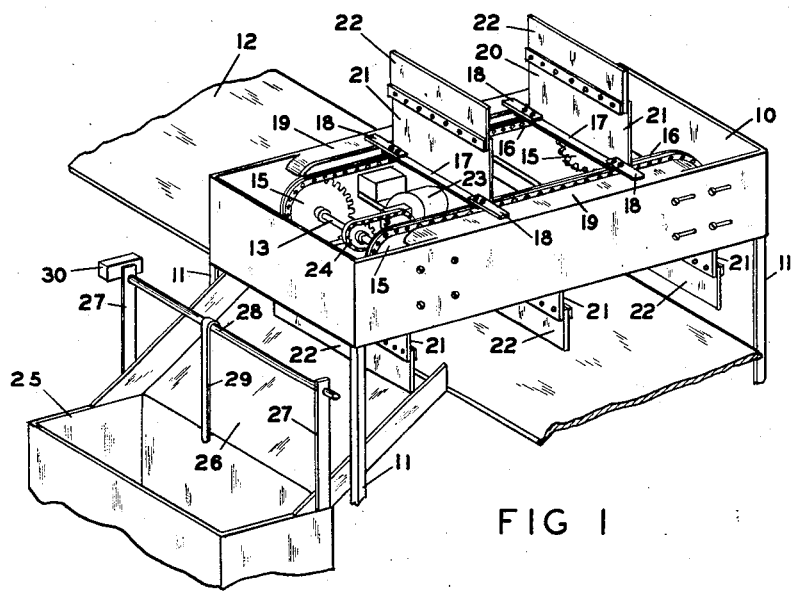
Fig. 1 is a perspective view of automatic hopper feed conveyor mechanism constructed in accordance with my invention and positioned over a continuous conveyor belt to feed material from the conveyor belt into a hopper positioned adjacent to the conveyor belt.
Figure 2:
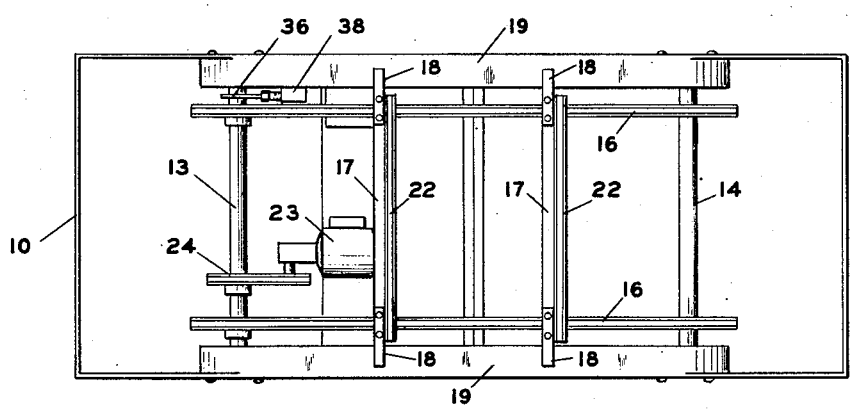
Fig. 2 is a top plan view of the mechanism illustrated in Fig. 1.
Figure 3:
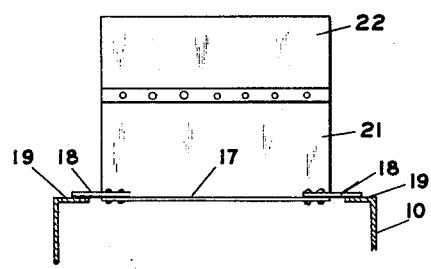
Fig. 3 is a view of a detail showing the construction and arrangement of a feeder paddle of the machine illustrated in Fig. 1 as this paddle passes over the top of the machine.
Figure 4:
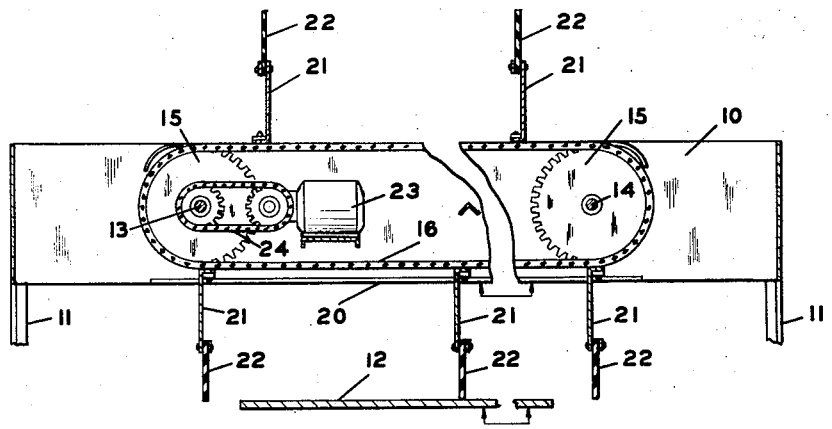
Fig. 4 is a partially broken cross-sectional view of the machine illustrated in Fig. 1.

Referring now in detail to the embodiment chosen for purpose of illustration, and to Figs. 1, 2 and 4, in particular, a frame 10 supported by uprights 11 is positioned over a conventional conveyor belt 12. Drive shaft 13 and idle shaft 14 are horizontally spaced and journaled transversely within frame 10, these shafts being provided with properly positioned sprockets 15 fixed thereon so as to support spaced longitudinal driving chains 16 which are substantially at right angles to conveyor belt 12. Positioned along driving chains 16 are a plurality of conveying means or paddles including spaced transverse paddle carrying bars 17 so arranged that upon each revolution of drive shaft 13, each individual bar 17 will be moved to the preceding bar's former position. Bearing arms 18, which extend from the ends of each of bars 17 beyond chains 16, are positioned to ride on flanges 19 which extend inwardly from the top edge of the sides of frame 10 and flanges 20 which extend inwardly from the bottom edge of the sides of frame 10. Paddles 21 extend outwardly from each of bars 17 and are provided at their ends with flexible sweeps 22 which are flat rectangular members which may be made of flexible fabric or rubber-like material.

Drive shaft 13 is driven by an actuating means such as motor 23 acting through sprocket and chain drive 24. Upon actuation of motor 23, drive chain 16 will move the paddles horizontally across the top of frame 10 and then down and horizontally across the bottom of frame 10, then up again so that sweeps 22 will pass horizontally across belt 12 moving substantially right angles to the travel of conveyor belt 12 and sweeping articles thereon, off of one edge of the belt.

Positioned adjacent one edge of belt 12 is hopper 25 which is provided with inclined chute 26 as shown in Fig. 1. As sweeps 22 pass across belt 12, material is swept from belt 12 down chute 26 and into hopper 25. Brackets 27 extend up from hopper 25 and support a detecting means which includes limit switch actuating shaft 28 journaled between brackets 27, a detector arm 29 which extends down from shaft 28, and a mercury switch 30 mounted on shaft 28 in counterbalance arrangement with detector finger 29, so that when hopper 25 becomes filled with material from belt 12, any additional material fed down chute 26 will act against detector arm 29 thereby rotating shaft 28 and tilting mercury switch 30.

Figure 5:
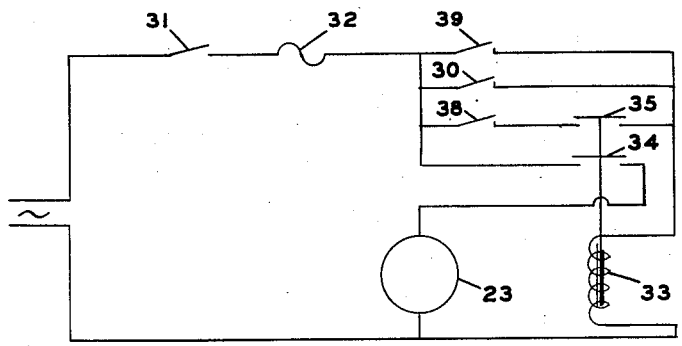
Fig. 5 is a schematic wiring diagram of the electrical circuit incorporated in the machine illustrated in Fig. 1.

In Fig. 5, I have shown an electrical circuit for actuating motor 23 which includes a manually operated live switch 31 and a fuse 32. When my machine is placed in operation, switch 31 is closed and mercury switch 30 is also closed as long as detector arm 29 in Fig. 1 extends directly downward; therefore, current is passed through relay coil 33 which in turn closes relay contacts 34 and 35. With contact 34 closed, current will be passed to motor 23 as long as mercury switch 30 remains closed; however, upon rotation of shaft 28, mercury switch 30 will be tilted and opened, thereby breaking the circuit to the relay coil 33 and opening relay contacts 34 and 35.

Figure 6:
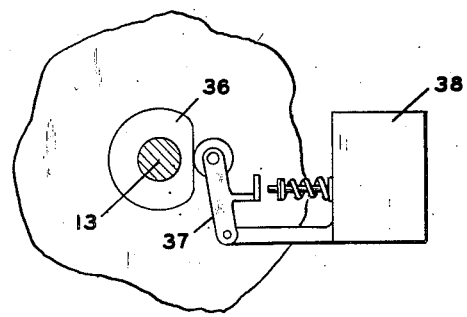
Fig. 6 is a view of a detail showing the travel limiting switch which positions the paddles of the machine illustrated in Fig. 1.

In order to position paddle members 22 at substantially the same place with relation to belt 12, I have provided a cam 36 on drive shaft 13, seen most clearly in Fig. 6, which cam actuates through cam follower 37, a paddle positioning switch 38 fixed to frame 10 and which, as illustrated in Fig. 5, is in series with relay contact 35, these switches being in parallel with mercury switch 30. Therefore, after actuation of motor 23 by closing of mercury switch 30, motor 23 will continue to run as long as switch 38 is closed since current will be passed through switch 38 and relay contacts 35 and through coil 33 thereby holding contacts 34 and 35 closed until switch 38 is opened by rotation of cam 36 whereby paddle 22 is stopped at its predetermined position. It is apparent that material is fed from belt 12 into hopper 25 until the hopper is filled, and then mercury switch 30 is opened as described above, thus stopping motor 23 upon opening of switch 38.

Switch 39 is in parallel with mercury switch 30 and is used to manually control the motor in the event that automatic operation is not desired.

While I have illustrated and described a hopper feed conveyor mechanism having paddles which will always stop with one paddle in the center of the conveyor belt 12, it may be found desirable, particularly when conveyor belt 12 is a narrow belt, to so arrange the paddles that they will stop with successive paddles adjacent the edges of conveyor belt 12. In either event, the paddles, when stopped, will not materially interfere with the flow of material on conveyor belt 12.

It is apparent therefore that in practical application, a plurality of my hopper feed conveyor mechanisms may be positioned at spaced intervals along the travel of conveyor belt 12 and thus feed a plurality of individual hoppers similar to hopper 25.

It will be obvious to those skilled in the art that many variations may be made in the single embodiment disclosed and described without departing from the scope of my invention as defined by the following claims:

I claim:

1. In automatic conveyor mechanism for feeding material from a moving conveyor belt into a hopper positioned adjacent the edge thereof, conveying means including a plurality of paddles positioned above said moving conveyor belt and movable thereacross with a sweeping action to contact material on said moving conveyor belt for sweeping a portion of said material from said moving conveyor belt into said hopper while other of said material is carried beyond said paddles by said conveyor belt, detecting means for detecting the size of the supply of said material in said hopper, and actuating means responsive to said detecting means for actuating said conveying means.

2. In automatic conveyor mechanism for feeding material from a moving conveyor belt into a hopper positioned adjacent the edge thereof, conveying means for conveying material from said moving conveyor belt to said hopper, detecting means for detecting when said hopper is filled with said material, motive power means for actuating said conevying means and responsive to said detecting means, and holding means responsive to the position of said conveying means, said motive power means and said holding means being cooperatively connected and arranged to stop said conveying means at a predetermined position with respect to said conveyor belt.

3. A structure as specified in claim 2 wherein said conveying means includes paddles arranged and constructed to pass across said conveyor belt.

4. A structure as specified in claim 3 wherein said holding means includes a switch responsive to the position of said paddles.

5. In automatic hopper feed conveyor mechanism for feeding material from a conveyor belt into a hopper positioned adjacent the edge thereof, a frame disposed over said conveyor belt, spaced shafts supported for rotation by said frame, driving chains extending around and driven by said shafts, a plurality of paddles spaced on said chains and extending outwardly therefrom, sweep members fixed to said paddles and arranged to sweep material from said conveyor belt into said hopper, driving means attached to one of said shafts for rotating said shaft and driving said chains, a shaft supported above said hopper, an arm fixed to said shaft and extending toward said hopper for detecting when said hopper is filled, a switch fixed to said shaft, a cam fixed to one of said shafts, a sweep member positioning means fixed to said frame and responsive to said cam, and electrical means responsive to said switch to actuate said driving means and also responsive to said switch and said sweep member positioning means to stop the movement of said sweep members at a predetermined position.

6. In automatic conveyor mechanism for feeding material from a moving conveyor belt into a hopper positioned adjacent the edge thereof, a frame extending over said conveyor belt, spaced shafts supported for rotation within said frame, driving chains extending around and driven by said shafts, a plurality of paddles on said chains extending outwardly from said chains and arranged to sweep a portion of said material from said conveyor belt into said hopper while other of said material is carried beyond said paddles by said conveyor belt, driving means for rotating one of said shafts and driving said chains, an arm connected to said hopper and extending toward said hopper for detecting when said hopper is filled, a switch connected to said arm, electrical means responsive to said switch to actuate said driving means, and holding means responsive to the position of said paddles for maintaining actuation of said driving means until said paddles have reached a predetermined position with respect to said conveyor belt.

7. In automatic hopper feed conveyor mechanism for feeding material from a conveyor belt into a hopper positioned adjacent the edge thereof, a frame extending over said conveyor belt, driving chains supported within said frame, a plurality of paddles extending outwardly from said driving chains and arranged to sweep material from said conveyor belt into said hopper, driving means driving said chains, a shaft supported above said hopper, an arm fixed to said shaft and extending toward said hopper for detecting when said hopper is filled, a mercury switch fixed to said shaft in counterbalance arrangement with said arm, a cam connected to said chains, a paddle positioning switch fixed to said frame and responsive to said cam, and electrical means responsive to said mercury switch to actuate said driving means and also responsive to said mercury switch and said paddle positioning switch to stop the movement of said paddles at a predetermined position.

8. In automatic hopper feed conveyor mechanism for feeding material from a conveyor belt into a hopper positioned adjacent the edge thereof, a frame supported by uprights and extending over said conveyor belt, spaced shafts supported for rotation within said frame, driving chains extending around and supported by said shafts, a plurality of bars spaced on said chains, paddles extending outwardly from said bars, flexible sweep members fixed to said paddles and arranged to sweep material from said conveyor belt into said hopper, driving means attached to one of said shafts for rotating said shaft and driving said chains, a shaft supported above said hopper, an arm fixed to said shaft and extending toward said hopper for detecting when said hopper is filled, a mercury switch fixed to said shaft in counterbalance arrangement with said arm, a cam fixed to one of said shafts, a paddle positioning switch fixed to said frame and responsive to said cam, and electrical means responsive to said mercury switch to actuate said driving means and also responsive to said mercury switch and said paddle positioning switch to stop the sweep of said paddles at a predetermined position.

9. In combination in automatic conveyor mechanism for feeding material from a moving conveyor belt into a hopper positioned adjacent an edge thereof, a plurality of paddles positioned above said moving conveyor belt, means connecting said paddles in tandem and operable to sweep said paddles in a straight line across said moving conveyor belt to contact material on said moving conveyor belt for sweeping certain of said material from said moving conveyor belt into said hopper while other of said material is carried beyond said paddles by said conveyor belt, said paddles being of thin blade-like construction having a long axis substantially aligned with the longitudinal axis of said conveyor belt so that said paddles face the edges of said conveyor belt at all times and present only their thin sides in opposition to the normal flow of material carried along past said paddles by said conveyor belt.

References Cited in the file of this patent

UNITED STATES PATENTS

| | | |
|---|---|---|
| 1,980,411 | Kimball et al. | Nov. 13, 1934 |
| 2,254,290 | Joa | Sept. 2, 1941 |
| 2,412,137 | Fink | Dec. 3, 1946 |